(12) United States Patent
Wilson

(10) Patent No.: US 7,535,150 B1
(45) Date of Patent: May 19, 2009

(54) CENTRIFUGAL TURBINE BLOWER WITH GAS FOIL BEARINGS

(75) Inventor: Walter Wilson, Bangor, PA (US)

(73) Assignee: PRC Laser Corporation, Landing, NJ (US)

( * ) Notice: Subject to any disclaimer, the term of this patent is extended or adjusted under 35 U.S.C. 154(b) by 222 days.

(21) Appl. No.: 11/429,933

(22) Filed: May 8, 2006

(51) Int. Cl.
H02K 17/00 (2006.01)
(52) U.S. Cl. ..................................... 310/166
(58) Field of Classification Search ................ 310/166, 310/90; 417/423.12
See application file for complete search history.

(56) References Cited

U.S. PATENT DOCUMENTS

| | | | |
|---|---|---|---|
| 4,316,434 A | 2/1982 | Bailey | |
| 4,348,066 A | 9/1982 | Agrawal | |
| 4,672,622 A | 6/1987 | Gurs | |
| 4,764,085 A | 8/1988 | Jesinger | |
| 4,899,363 A | 2/1990 | Murray | |
| 4,925,321 A | 5/1990 | Maruyama | |
| 5,206,873 A | 4/1993 | Funakubo | |
| 5,273,368 A | 12/1993 | Asada | |
| 5,285,457 A | 2/1994 | Funakubo | |
| 5,370,463 A | 12/1994 | Asada | |
| 5,497,615 A * | 3/1996 | Noe et al. ................. | 60/39.511 |
| 5,556,208 A | 9/1996 | Ide | |
| 5,562,406 A | 10/1996 | Ooka | |
| 5,563,490 A * | 10/1996 | Kawaguchi et al. ......... | 318/808 |
| 5,564,914 A * | 10/1996 | Kobayashi et al. ....... | 417/423.7 |
| 5,608,278 A | 3/1997 | Mey | |
| 5,704,768 A * | 1/1998 | Kobayashi et al. ............ | 417/62 |
| 5,799,031 A | 8/1998 | Marie | |
| 5,845,509 A | 12/1998 | Shaw | |
| 5,856,992 A | 1/1999 | Karube | |
| 5,947,606 A | 9/1999 | Wanger | |
| 5,998,898 A | 12/1999 | Fukutani | |
| 6,024,491 A | 2/2000 | Bak | |
| 6,074,771 A | 6/2000 | Cubukcu | |
| 6,132,573 A | 10/2000 | Cubukcu | |
| 6,220,035 B1 | 4/2001 | Lenertz | |
| 6,329,139 B1 | 12/2001 | Nova | |
| 6,330,525 B1 * | 12/2001 | Hays et al. ................... | 702/183 |
| 6,368,082 B1 | 4/2002 | Conrad | |
| 6,417,590 B1 | 7/2002 | Komura | |
| 6,428,211 B1 | 8/2002 | Murabe | |
| 6,502,989 B1 | 1/2003 | Takeuchi | |
| 6,535,539 B1 | 3/2003 | Nakao | |
| 6,608,415 B2 | 8/2003 | Komura | |
| 6,653,517 B2 | 11/2003 | Bullock | |

(Continued)

OTHER PUBLICATIONS

Agrawal, Giri L. Foil Air Gas Bearing Technology—An Overview. International Gas Turbine & Aeroengine Congress & Exhibition. Orlando, Florida. Jun. 1997.

Primary Examiner—Javaid Nasri
(74) Attorney, Agent, or Firm—Ward & Olivo

(57) ABSTRACT

Disclosed is a centrifugal turbine gas blower with foil bearings for use with a fast axial flow laser. The blower utilizes variable components in order to operate at different speeds for multiple applications. In addition, a bypass load has been incorporated to avoid a surge condition. The blower utilizes foil bearings that are self-lubricating in order to achieve improved efficiency and maximized speeds during operation. The bearings are designed with a bump layer that provides damping for pre-load. Additionally, the backplate of the thrust assembly contains holes in order to reduce the thrust load and to balance the force on the impeller.

11 Claims, 7 Drawing Sheets

U.S. PATENT DOCUMENTS

| | | |
|---|---|---|
| 6,703,153 B1 | 3/2004 | Cubukcu |
| 6,853,668 B1 | 2/2005 | Taufenbach |
| 6,893,720 B1 | 5/2005 | Nakahigashi |
| 6,914,919 B2 | 7/2005 | Watson |
| 2003/0169951 A1* | 9/2003 | Nishijima et al. ........... 384/103 |
| 2004/0005228 A1 | 1/2004 | Agrawal |
| 2004/0066991 A1 | 4/2004 | Agrawal |
| 2004/0179947 A1 | 9/2004 | Agrawal |
| 2004/0207158 A1 | 10/2004 | Agrawal |
| 2005/0147335 A1 | 7/2005 | Agrawal |
| 2005/0185865 A1 | 8/2005 | Agrawal |
| 2005/0189720 A1 | 9/2005 | Agrawal |

* cited by examiner

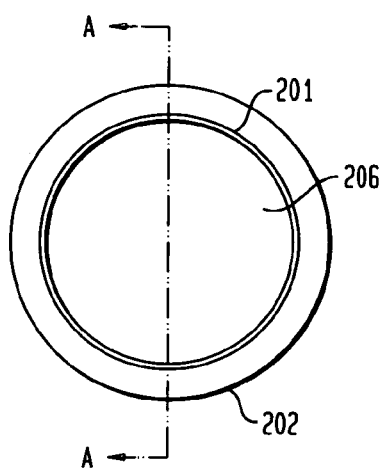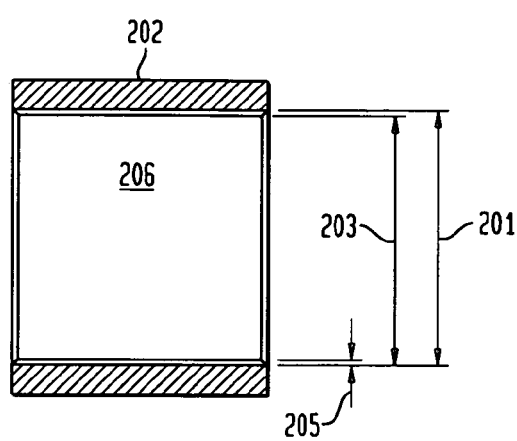

CENTRIFUGAL TURBINE BLOWER WITH GAS FOIL BEARINGS

FIELD OF INVENTION

The present invention relates generally to gas circulation blowers for lasers. More specifically, the present invention relates to a centrifugal turbo gas blower which utilizes one or more foil bearings in combination with one or more Carbon Dioxide ("$CO_2$") lasers.

BACKGROUND

Each component in the design of a laser system is important for the proper functionality of a system as a whole. In particular, the design of an axial flow $CO_2$ laser must contain a gas circulation blower to ensure the performance of the device. The systems' blower has to circulate gases at high velocities through the laser's active plasma region to maintain efficient operation and provide stable laser output power.

There are a variety of gas circulation blowers, or compressors, available for use with the $CO_2$ laser system. Each design has advantages and disadvantages for the specific use and performance of the overall system. Current gas blowers include the regenerative (side-channel), radial (multi-stage), and centrifugal. In addition, there are three types of centrifugal blowers, dependent on the bearing design. The bearing designs include oil mist lubricated radial ball bearings, active magnetic bearings, and gas foil bearings. The regenerative, radial, and oil mist centrifugal blowers all contain contact-type bearings, whereas the active magnet centrifugal blower is a non-contact type bearing. The foil bearing centrifugal blower is a contact-type bearing only at low rotational speeds. However, at operational speeds it acts as a non-contact type bearing.

The regenerative compressor utilizes hybrid ceramic ball bearings with a grease lubricant, reaching peak rotational speeds of about 18,000 rotations per minute (rpm). This compressor requires little maintenance. In addition, any maintenance required, such as bearing replacement, can be done in the field. However, a regenerative compressor is quite inefficient, achieving only 35% pump efficiency. Consequently, the compressor releases up to 65% of its output as waste heat, which is released into the laser system. As a result, this system requires constant cooling to remove the excess heat.

The radial compressor, or gas blower, is the most utilized compressor because of its high laser power output. A single blower can produce a laser power of up to 5,000 Watts (W) and 35,000 rpm. Similar to the regenerative systems, the radial compressor utilizes ceramic ball bearings and a grease lubricant. As with the regenerative compressor, efficiency is approximately 35%. Unlike the regenerative system, however, the radial system is difficult to maintain. Continuing maintenance, which cannot be performed in the field, depends on numerous factors such as supercritical blower operation, below peak efficiency operation (for the size of the system's impeller), and multistage arrangement configuration (for the needed pressure differentials).

A centrifugal blower can utilize any of the aforementioned bearing assemblies and can reach much higher rotational speeds than regenerative or radial blowers, which provides higher pumping efficiencies. For example, pump speeds are approximately 60,000 rpm for a foil blower (although 150,000 rpm has been achieved). Typical rpms for oil mist blowers are approximately 70,000 rpm for an active magnetic blower. However, the principal disadvantage with such a system is that it cannot operate at peak efficiency for the impeller, because the bearings are limited by both speed and load capacity. Also, bearings must have a diameter small enough to limit the rolling surface speed below the damage threshold while supporting the rotational assembly with a high enough stiffness. As a result, an oil mist blower operates at both a relatively lower horsepower ("HP") and a lower pressure differential than a regenerative pump. These deficiencies are only partially offset by the use of gas bearings.

An active magnet centrifugal blower can operate at peak efficiencies. However, this blower still has several disadvantages. For instance, the magnetic blower is very expensive and contains very complex bearing control units. Further, an active magnetic bearing needs a redundant bearing system in the event of power failure, which results in a loss of magnetizing power.

The original technology for a foil bearing design was developed over 20 years ago. The design was primarily used by NASA and Naval aircrafts, and has been used in air cycle pumps for aircrafts, turbochargers, cryogenic pumps, helium pumps, high speed motors, textile spindles, and more. The basic design is hydrodynamic. A load carrying gas film is created between the shaft and foil as a result of shaft rotation and gas viscosity. This allows for both radial and axial support during shaft rotation, which allows for higher rotational speeds. The higher rotational speed provides more power to pumps at improved efficiencies. Under these conditions a single pump can power a laser up to 8,000 W.

The foil bearing consists of a thin smooth inner surface layer and a bump foil primary, outer surface. The bump design allows for sufficient damping for thermal growth, centrifugal growth, and misalignment of the shaft during high-speed operation.

These conditions, however, do not allow complete freedom of design. Every component of the system must still be assessed to determine if the bump design sufficiently handles the damping at higher speeds. This determination requires an analysis of the rotor dynamics and the thermal characteristics of the blower. However, a majority of the current blowers are not designed to properly handle a foil bearing, and cannot reach the higher rotational speeds necessary for optimum pumping efficiency. Due to these design limitations, the previous blower constraints must be removed and a different blower design must be utilized to maintain the pressure differentials and speeds made available by the foil bearing design.

In addition, efficiency and power consumption depend greatly on the blower functionality within the system. If the system is not properly cooled and/or heated, then it will not function at maximum efficiency. If the blower is more efficient, overall waste heat and power consumption drops dramatically. Therefore, the blower must be designed to maximize efficiency while also functioning within the prescribed requirements of the overall system.

As previously discussed, bearing design has a significant affect on the maintenance of the blower. If the bearings wear easily, they must be replaced more often. Accordingly, it is desirable to design a system wherein the blower and bearings are easily serviceable in their respective environment. Further, such a system should have extended maintenance intervals, which can help reduce costs.

Because current laser systems are expensive, inefficient, and often require repair, there is a clear need in the art for a laser system which is inexpensive, requires little or no maintenance, and is more efficient. The current invention overcomes these and other deficiencies by providing a centrifugal blower with foil bearings. The current invention, therefore, provides a laser system which is cheaper, requires less maintenance, and is more efficient while maintaining requisite output levels.

SUMMARY OF THE INVENTION

The present invention provides a centrifugal turbine blower that incorporates foil bearings to provide increased efficiency and functionality of the laser with which it is used, as well as decreased maintenance costs. More specifically, the present invention utilizes a blower with one or more radial foil bearings in order to save energy, reduce the heat load chiller size, lower material costs, and increase overall functionality of the laser system as a whole.

The blower design of the present invention allows for increased rotational speeds due to the reduced limitations of the bearing design. With a non-contact, self-lubricating foil bearing, a single unit blower is configured for lasers up to 8 kilowatts (kW). In addition, the blower re-circulates the flow gas from the laser (around 10-15%), which cools the bearings and motor allowing for the potential use of an AC motor in place of the DC motor which is currently utilized in most systems.

Another embodiment of the present invention allows for variable compressor size dependent on the laser flow requirements. This allows for peak efficiencies of different combinations of impellers, diffusers, shrouds and covers between 3 kW and 8 kW. The blower in accordance with the present invention is designed with a bypass load and variable speeds through its variable compressor design in order to avoid surge conditions during laser operation. The variable blower allows for the motor, bearings and housing to remain unaltered. As a result, the internal combination of the impeller, diffuser and shroud determine the output. This allows for variable speed control in order to balance the gas conditions within the system.

Further, the design of the impeller has been altered to reduce the thrust load on the bearings during operation. The impeller of the blower has holes drilled into the backplate, which reduces the downward aerodynamic thrust load and decreases the overall thrust load on the bearings. These holes are strategically drilled as to not create any additional stress points in the plane of the impeller. Consequently, the primary thrust load is then the weight of the rotor and the force on the impeller is balanced. As well, if the thrust bearing assembly does not have the capacity to carry such a load, an additional thrust disk may be inserted.

In addition to maintaining the aforementioned loads, the present invention provides radial and thrust foil bearings that allow for decreased maintenance intervals, increased pump efficiency, and increased speeds for high laser output capabilities. These bearings are designed with a bump foil layer below an outer, smooth foil and the inner shaft. The bump foil accommodates expansions during high loads, misalignment and high temperatures, while the inner foil layer (shaft) provides lubrication. Although the bump foil provides clearance in pre-load conditions from the generated hydrodynamic pressure and shaft turn, a dry lubricant coating can also be added to the bearing prior to usage to prevent wear during startup and shut down. However, during usage, the bearing provides its own lubrication in the form of a gas film. The bump foil also provides proper damping from relative sliding, maintaining machine stability.

In addition, the present invention provides a smaller, more compact assembly, which will significantly reduce package sizing in comparison to the laser systems currently available with multiple blowers.

Another embodiment allows for no field maintenance of the bearings due to the fact they are gas lubricated, or non-contact. This factor also increases between maintenance intervals for the optical components in the system by eliminating bearing oils and greases often the source of contamination of optical elements.

In light of the foregoing, it is an object of the invention to provide a laser gas circulation blower for a CO2 laser which utilizes gas foil bearings for high reliability, clean non-contaminating operation and reduced maintenance intervals.

Still another object of the current invention is to create a laser gas circulation blower for a CO2 laser having a variable impeller, shroud diffuser combination allowing for exact matching of pump capacity and laser power resulting improved overall laser electrical efficiency, reduced cooling loads and lower operational costs.

Further, it is an object of the present invention to provide a laser gas circulation blower for a CO2 laser utilizing active flow and gas pressure regulation for improved laser power stability and higher efficiency.

Yet another object of the present invention is to provide a lower cost gas circulation blower.

Still another object of the present invention is to provide a self contained laser gas circulation blower providing integral bearing and rotor cooling means by utilizing a bypass gas circuit.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 1A depicts a cross-sectional view of the journal bearing assembly in the preferred embodiment of the present invention;

FIG. 1B depicts a side view of the bearing assembly taken along the 1B-1B line of the FIG. 1A;

DETAILED DESCRIPTION

Figure 2:
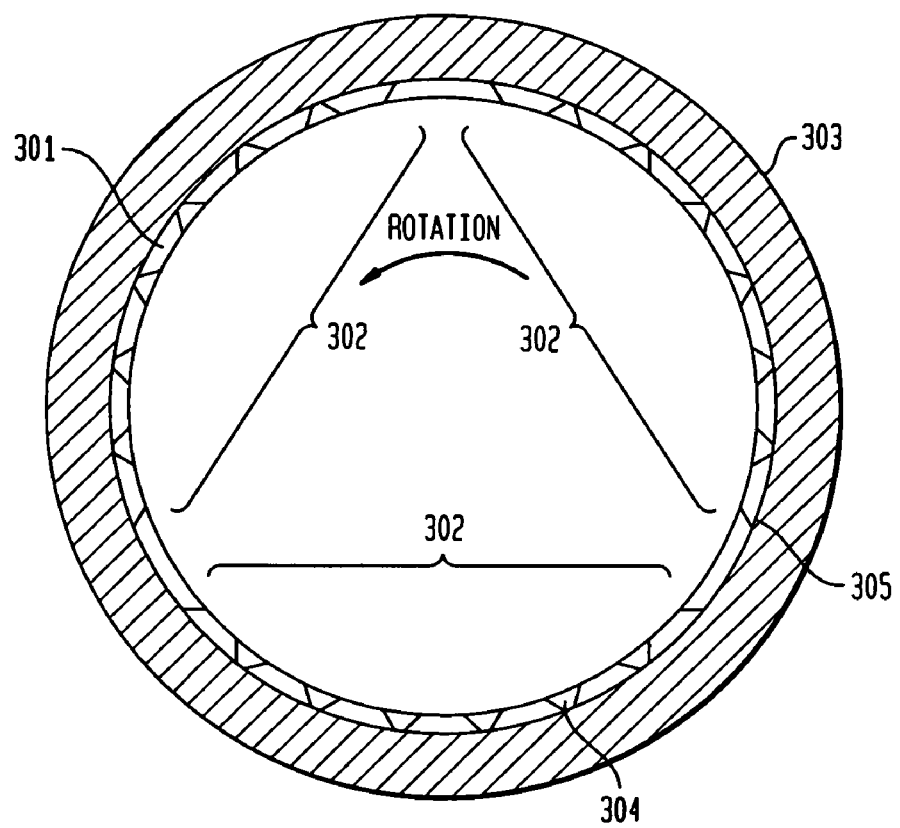
FIG. 2 depicts a diagram of the radial bearing configuration in the preferred embodiment of the present invention.

As required, a detailed illustrative embodiment of the present invention is disclosed herein. However, techniques, systems, and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

The following presents a detailed description of the preferred embodiment of the present invention, as well as some alternate embodiments of the invention. Reference is herein made to the figures, wherein the numerals representing particular parts are consistently used throughout the figures and accompanying discussion.

Referring to Table 1, depicted is the compressor functionality as a function of the variable operating characteristics of the present invention.

TABLE 1

Compressor Functionality

| | Units | Small | Medium | Large |
|---|---|---|---|---|
| Gas Molecular Weight | 75% He, 22% N2, 3% CO2 | 10.438 | 10.438 | 10.438 |
| Inlet Pressure | Torr | 90 | 90 | 90 |
| Outlet Pressure | Torr | 156 | 156 | 156 |
| Inlet Flow | Actual CFM Including Cooling Flow | 1283 | 2167 | 2783 |
| Mass Flow | Lb/Min | 4.02 | 6.79 | 8.72 |
| Mass Flow for Cooling | Lb/Min | 1.2 | 1.2 | 1.2 |
| Net Resonator Flow | Actual CFM Less Cooling Flow | 900 | 1784 | 2400 |
| Rotational Speed | Rev/Min | 55000 | 50000 | 50000 |
| Impeller Diameter | Inches | 6.952 | 7.596 | 7.596 |
| Pumping Efficiency | Percent | 74 | 75 | 75 |
| Aero HP | HP | 8.0 | 13.35 | 17.14 |
| Mechanical HP | HP | 0.5 | 0.5 | 0.5 |
| Total Blower HP | HP | 8.5 | 13.85 | 17.14 |
| Combined/Net Motot/Drive Efficiency | Percent | 90 | 90 | 90 |
| Net Electrical HP | HP | 9.44 | 15.39 | 19.04 |
| Net Electrical kW | kW | 7.06 | 11.51 | 14.24 |

Table 1 provides the variable characteristics of the different pump sizes in accordance with the present invention. More specifically, for a CO2 fast axial flow laser there is an optimum gas condition which produces the best overall operating efficiency and optical laser power stability. These conditions remain relatively constant for different laser output powers as the commonly used method of producing higher power lasers is to connect in series discharge tubes of common geometry. A typical mixture of laser gases is shown in line one of Table 1 having 75% Helium, 22% Nitrogen, and 3% CO2. A gas circulation blower pumps the gases through a fixed orifice which produces the needed gas turbulence in the discharge region and provides conditions suitable for a stable "glow" plasma discharge in the active laser gas area. Pressure loss through the orifice and discharge tubes corresponds to the pressure differential across the circulating pump as shown in lines 2 and 3 of Table 1. Better laser efficiency is obtained when these conditions are maintained in a constant state. Also, the efficiency of the laser device is proportional to the mass flow rate through the gas discharge tube. Hence the volumetric flow rate of the pump must be varied in proportion to the number of series connected discharge tubes in the laser cavity. This proportionate flow is shown in line 4 of Table 1 and expressed as actual inlet flow rate in CFM. Since a portion of the pumped gases bypasses the laser discharge and is used to cool the pump and bearings the total flow through the pump is the sum of the cooling gases required and the gases for the laser discharge. This is shown in line 5 and expressed as "Mass Flow" in lbs/minute.

Line 6 shows the gas mass flow rate required for motor and bearing cooling. For simplicity of calculation this is shown as being constant over the variable sizes of blower. In practice due to the reduction of motor load of the "small" and "medium" sized pumps some reduction in cooling requirement would be anticipated. However in the case of the "small" sized unit this reduction would be offset by higher bearing heat loads due to the higher rotational speed.

As is common with centrifugal pumping devices, impeller wheels have a characteristic pumping curve of flow versus pressure and achieve optimum pumping efficiency at a point on the curve determined by impeller diameter, rotational speeds, impeller vane profiles and the pressure temperature and molecular properties of the pumped fluid. Since in a CO2 laser application the properties of the pumped fluid operate in a reasonably constant region, the optimization of the centrifugal pump can be obtained by variation of diameter, vane profile and rotational speed. Further, keeping operating speeds approximately the same allows optimization with only two variables, diameter and vane profiles. As shown in Table 1, lines 7 and 8 only small changes to diameter or rotational speed are needed to allowing pumping efficiencies of approximately 74-75% for all three pumping conditions.

The resultant "Aero HP" is shown in line 10. This is the net energy need to pump the gas. Line 11 "Mechanical HP" is the power required to overcome the losses due to gas friction in the radial and thrust bearings. As with the cooling load, this value is assumed constant over the various models of pump since the rotational speeds are approximately the same and motor load has little influence on this value. The resultant "Total blower HP" (line 12) is the sum of the Aero and Mechanical HP numbers. By factoring in the efficiency of the motor and motor drive (line 13) a total HP requirement can be determined as "Net Electrical HP" or "Net Electrical kW," depicted in lines 14 and 15, respectively. With state of the art motor and drive electronics, system efficiencies can be optimized over a wide range of motor loads, thereby allowing numerous possible optimized pumps limited only by the motor capacity, drive capacity and dynamic characteristics of the rotating assembly. This results in substantially reduced energy requirements when compared with lasers where the pump design does not allow for such optimization.

FIGS. 1A and 1B provide a cross-sectional and layout drawing of the lower radial bearing. A bearing consists of an outer shell 202 with an inner diameter 201 that is around a journal 206. In a preferred embodiment, bearing shell 202 has an outer diameter of 1.6 inches (in.) and an inner diameter 201 of 1.3 in. Of course, other diameters can be used in accordance with the present invention. In the preferred embodiment, radial gap 205 between nominal journal 206 and outer diameter 203 is 0.25 in. In the preferred embodiment, the shell inner diameter has a smooth foil thickness of 0.004 in., bump foil thickness of 0.003 in., bump height of 0.016 in., radial clearance of 0.0018 in., though other dimensions are possible in accordance with the present invention. In the preferred embodiment, this totals 0.0248 in. of clearance for radial gap 205. Of course, when using alternate dimensions, other clearance amounts for the radial gap can be achieved.

Bump foils 305 are cut into ¼ in. strips in order to provide the flexibility for alignment and load required by the bearing, as seen in FIG. 2. As shown, bump foil 305 is located between outer bearing shell 303, shim 304, and inner smooth foil 301. Bump foil 305 consists of three 120 degree arc pads 302 that contain 7 bumps each, are placed radially within the middle of the arc and contain 2 millimeter (mm) shims 304. The shims 304 provide rotor stability and pre-load. As previously noted, dependent on the preferred system design, other dimensions and similar designs can be used in accordance with the present invention.

Figure 3A:
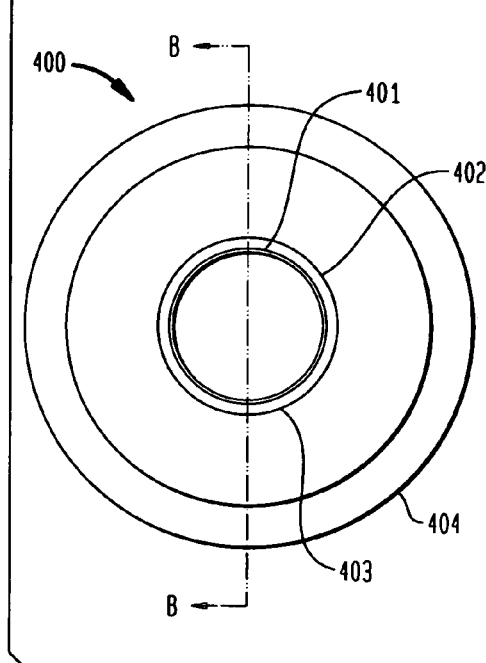
FIGS. 3A and 3B depict proposed diagrams of the combined radial and thrust foil bearing assembly in the preferred embodiment of the present invention.
Figure 3B:
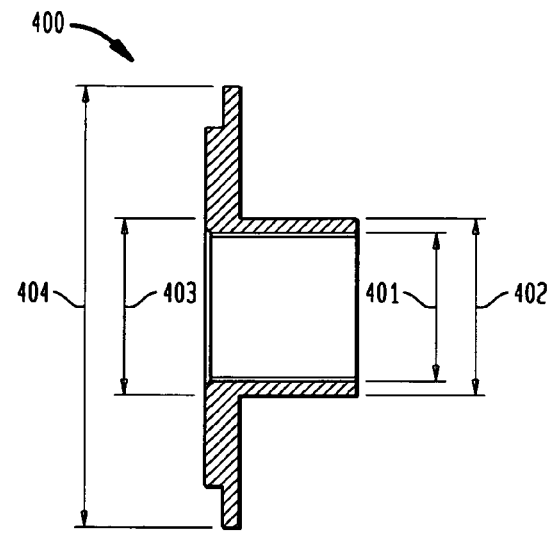

Next, FIGS. 3A-B depict combined thrust and radial bearing 400. FIG. 3A shows a cross sectional view of inner radial bearing 401, outer radial bearing 402, inner thrust bearing 403, and outer thrust bearing 404. In the preferred embodiment, the thrust bearing is designed for a load capacity of approximately 50 pounds and a thrust load of 39 lb. As well, other capacities can be achieved dependent on alternative bearing dimensions in accordance with the present invention. Inner diameter 403 of the preferred embodiment is approximately 1.5 in. and outer diameter 404 is approximately 3.25 in., although other dimensions can be used.

Figure 4:
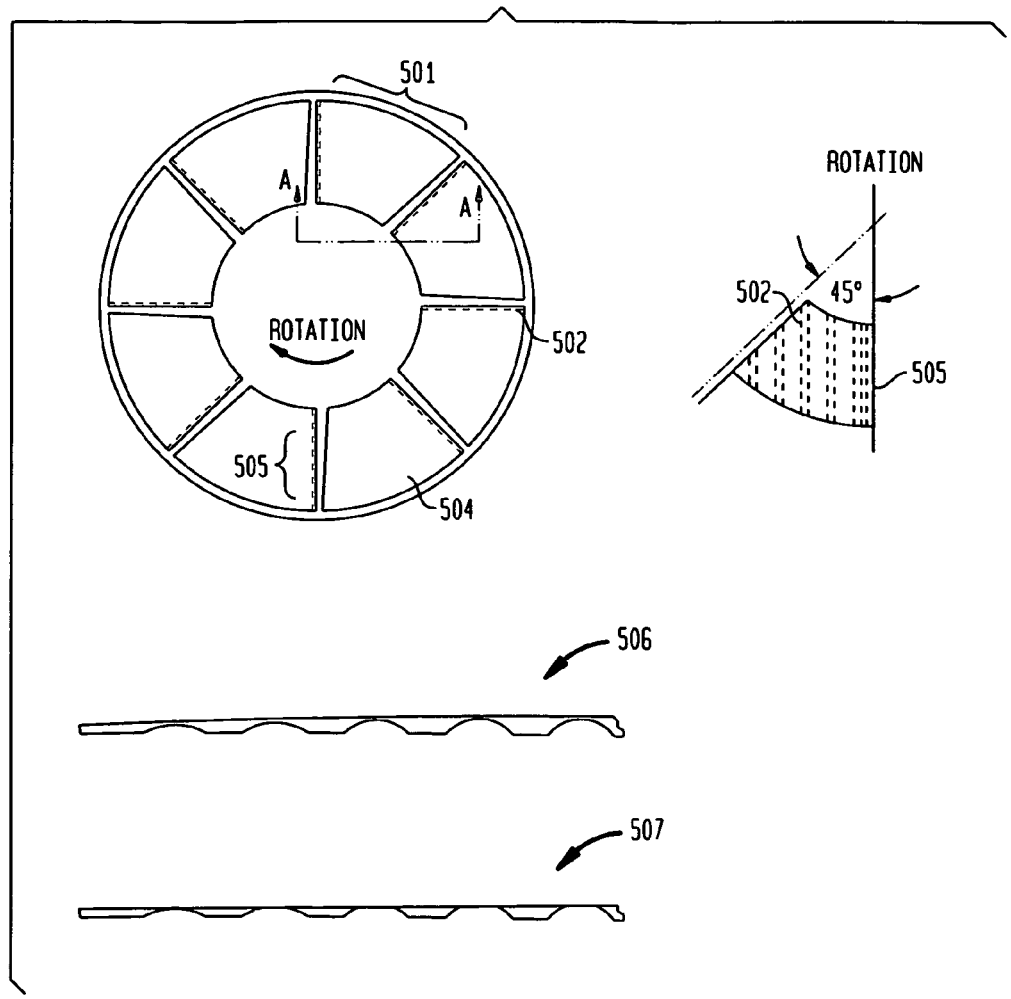
FIG. 4 depicts multiple views of a schematic diagram with dimensions for the thrust bearing configuration in the preferred embodiment of the present invention.

FIGS. 4A-C provide a closer view of the design for the thrust bearing. In this example, the bearing has eight pads 501 with the aspect ratio of the circumferential to radial width approximately equaling one as shown by 503. However, it is contemplated that any number of pads can be used in accordance with the present invention. The pads 501 have smooth top foil 504 and bump foil 502 that is parallel to the leading edge 505. The smooth foil is approximately 0.003 in. thick and made of Inconel alloy with a dry antifriction coating. Bump foil 502 is approximately 0.005 in. thick and made of Inconel Alloy. The bumps are variable in height in order to create a wedging slope at the leading edge for bearing action. These effects of this can be seen through view 506, before the load is applied and view 507, after a load is applied.

Figure 5:
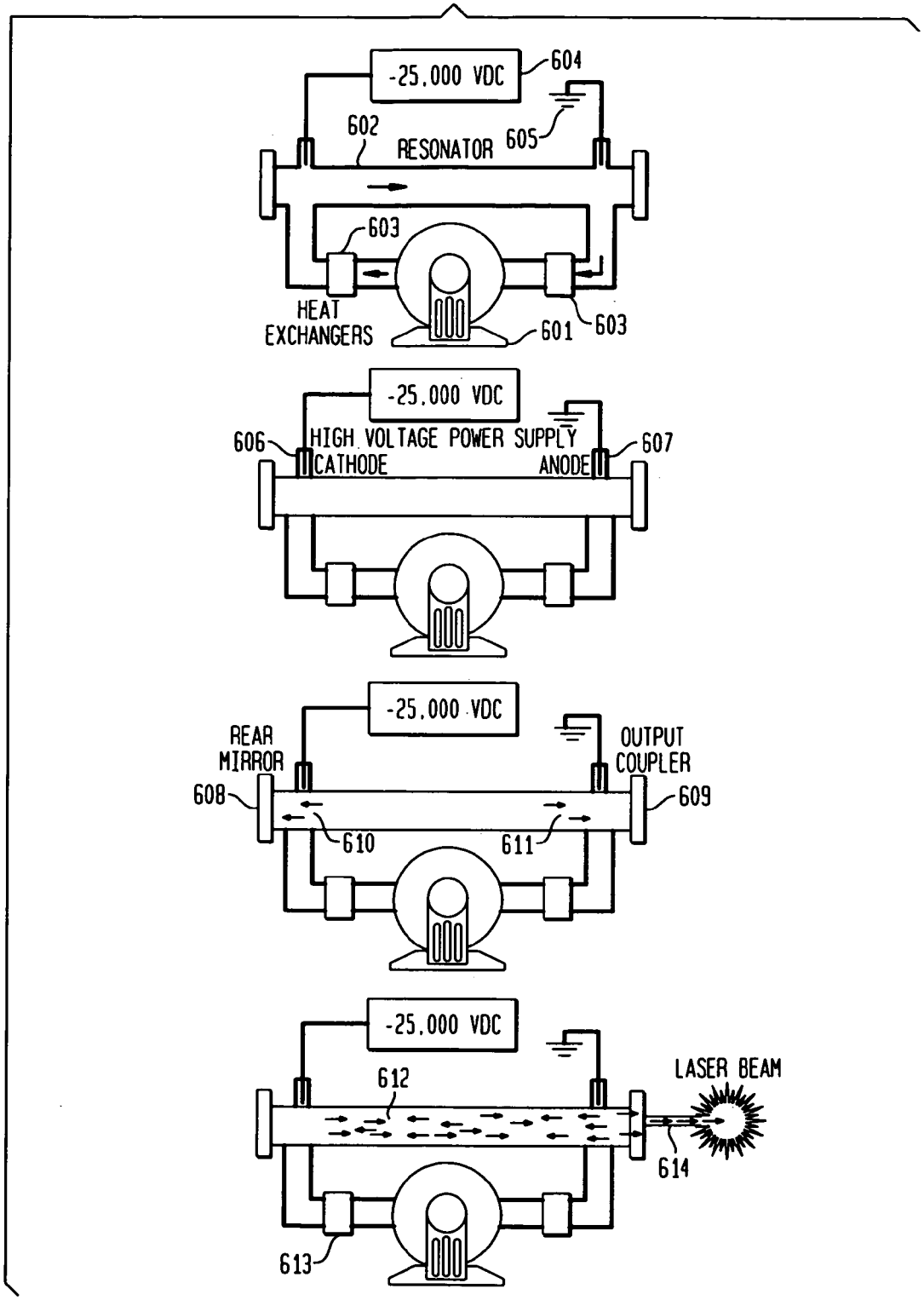
FIG. 5 depicts a centrifugal pump and its corresponding components for use within the preferred embodiment of the present invention.

FIG. 5 provides a visual representation of the overall system operation, with the combined components. The figure shows how compressor 601 controls the flow of lasing gas is circulated through the laser resonator 602 and heat exchangers 603. The heat exchangers 603 then cool the lasing gas, which maintains power output and efficiency.

Figure 6:
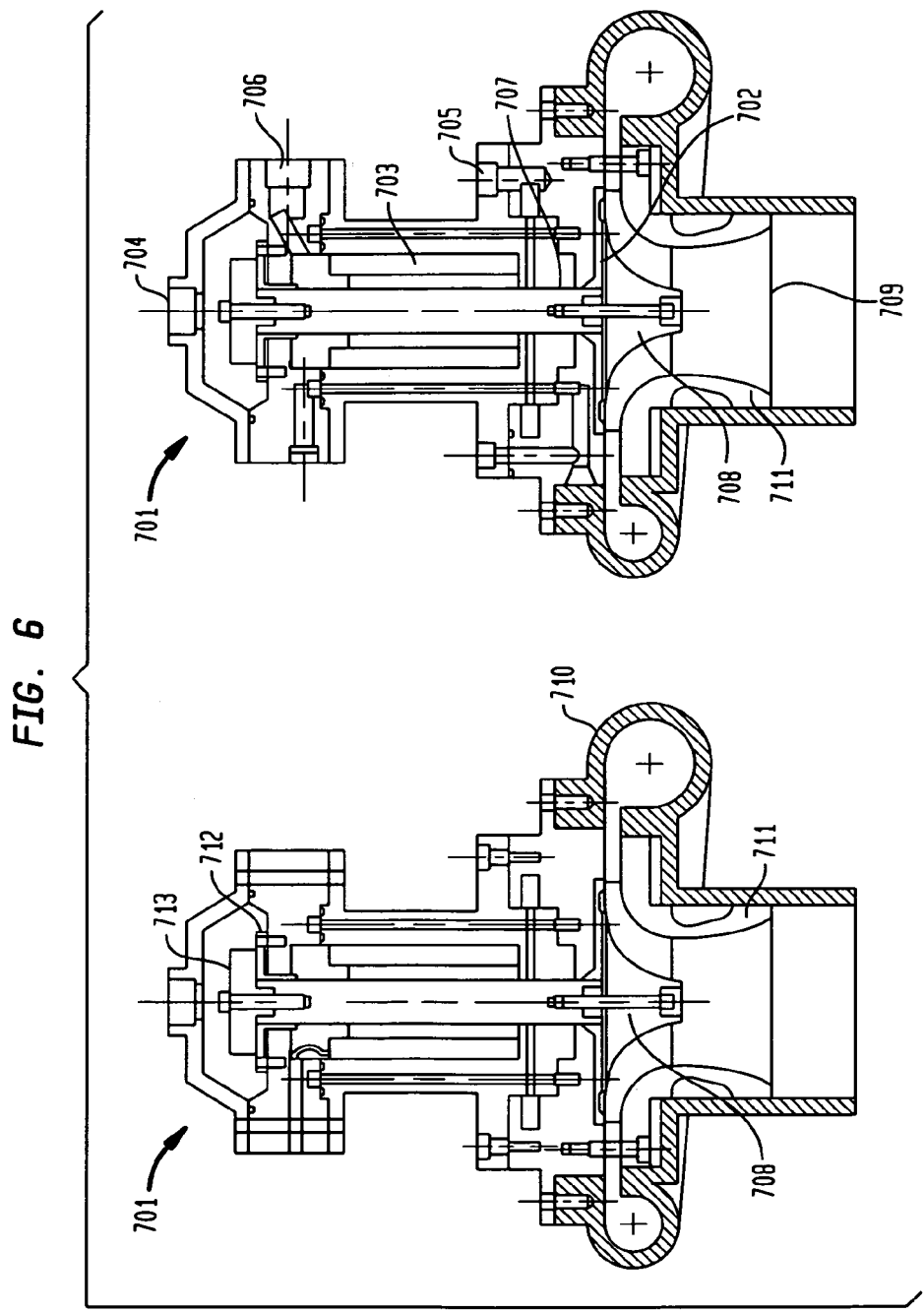
FIG. 6 depicts the variable blower sizes and their corresponding internal components.

Next, FIG. 6 provides visual representation of the components within the centrifugal pump, as well as the inside layout. The impeller/diffuser/shroud combination 701 has reduced load stress due to the holes drilled into the backplate 702 of the thrust assembly. Three variable sizes have been selected for use within the present invention. As well, the motor 703 is an induction motor, which is used to drive the impeller at high speeds.

The motor is oriented between the radial bearings and is made up of a rotor mounted to the rotating shaft and a stator mounted in water cooled housing with a plurality of cooling passages to remove excess heat from the assembly. Cooling gases are introduced at two points in the assembly to cool the three bearings as well as remove heat from the motor rotor. Gases enter at 704, 705 and are exhausted at port 706. A portion of the gases entering at 705 flow through the radial bearing 707 and enter the pump chamber at the back of the impeller 708 where they are recombined with the laser process flow. The balance of the flow entering at port 705 flows through the motor between the rotor and stator and are exhausted at port 706. Gases entering at port 704 flow through between the combined radial thrust bearing 712 and the rotating thrust disk 713. The gas is then exhausted at port 706 and is routed by means of a gas pipe (not shown) back to the pump inlet 709 where they are recombined with the laser process flow. The stationary impeller shroud 711 in conjunction with rotating impeller 708 form the pumping mechanism. Substitution of these two components by other impeller/shroud combinations of different diameter or vane profile allow for the creation of pumps with varying output characteristics without alteration of the motor and bearing assembly providing an economic means of producing a gas compressor matched to each model of laser.

Figure 7:
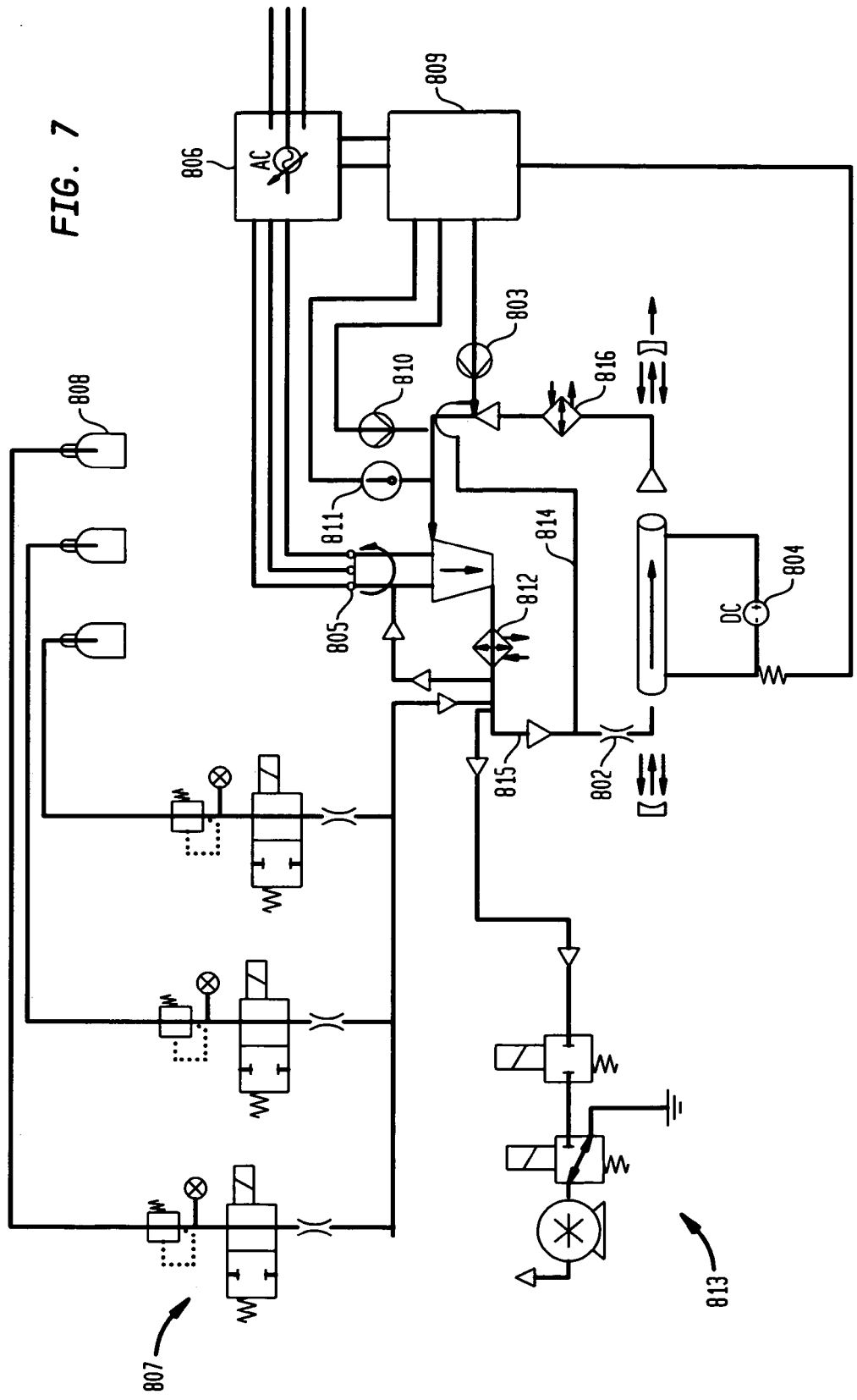
FIG. 7 depicts a diagram of the pump design and the compressor.

Finally, FIG. 7 provides a schematic diagram of the turbine system component configuration. Beginning at the bottom, a load pressure transducer 803 attached to just above the nozzle assembly 802 provides feedback of actual load conditions and provides a means for making slight adjustments of motor speed and laser cavity pressure which allows for the variable output characteristics and provides more uniform pump efficiency. A DC voltage source 804 is used for excitation of the laser gas, which is unlike the RF sources, which are more popular in the laser market. However, an RF source may also be used in the present application. Pressure sensor 810 and temperature sensor 811 detect condition of the gas entering the compressor inlet. In addition to providing fault and warning detection these sensors provide data used to compensate for variable gas conditions.

Another significant difference, as discussed previously, is the common motor and housing assembly that includes a variable impeller/shroud/diffuser combination, which allow for the unit to be built for specific laser models, dependent on three sizes. The primary difference in laser models is the number of discharge nozzles and tubes that are arranged as parallel gas circuits and series optical paths. This is necessary for the impeller to operate at maximum efficiency, which can only occur at certain speeds. As well, the compressor wheel must be operated within the correct operating conditions to avoid phenomena known as surge. A surge condition occurs when a centrifugal impeller is operated against an excess load resulting in an oscillating reversal of flow at the pump discharge. In other words, flows that are excessively high would not be able to pass through fixed nozzles unless there was an increased pressure drop and motor load, conditions that could result in surge at the pump discharge and damage to the pump.

The induction motor 805, 703 that can also be seen in FIG. 7 has a rotor of a copper bar type (i.e., it has small encapsulated copper rods arranged uniformly around the rotor perimeter). This design produces a low slip type motor that minimizes induction losses. In addition, though a synchronous or DC motor could be used within the present invention, it is not preferred because it requires additional feedback sensor components and circuit in order to detect the armature position. Additionally, the DC type motor includes rare earth type magnets that must be secured in position near the rotor surface. At the operational speed and power requirement s of this design this necessitates special alloy containment sleeves to keep the rotor from deforming due to the extreme stresses resulting from the centrifugal load. The induction motor does not require either a containment sleeve or a feedback circuit and operates with a larger and stiffer shaft which eliminates the complex rotor tie bolt arrangement seen in prior art. Due to the design of the present invention, a permanent magnet motor could be used. The permanent magnet motor reduces the rotor loss similar to the induction motor, however this design still needs further developed and would likely be a more expensive solution.

Another important aspect of the invention is the variable frequency drive source 806 that regulates the compressor speed through its supply of sinusoidal voltage to the turbine motor. The speed is determined by the poles located within the motor 805 and the frequency of the source 806. There are 2 poles located within the induction motor of the present invention, which, for example would provide 60,000 RPM for a 1000 Hertz source frequency. Control and regulation of the laser gas processes is accomplished with a microprocessor control 809. In addition to controlling and regulating the compressor this controller also operates the gas mixing unit 807 which blends gases from the bottled gas sources 808 into an exact mixture delivered at a specific flow to the laser. In an alternative configuration gas could be supplied from the gas source pre-blended allowing for replacement of the gas mixing unit 807 with a simpler flow control device. Pressure in the laser cavity is regulated by the control unit 809 by means of the vacuum pump and control valve assembly 813 using pressure feedback from pressure sensor 810.

An important feature of the present invention is the gas bypass line 814 used to route gases from the cold side (exit) of the upstream heat exchanger 812 to the gas inlet ports 704 and 705 of FIG. 6 and providing the necessary cooling of the bearing assemblies as well as the motor rotor. The upstream heat exchanger serves the purpose of rejecting heat resulting from gas compression in the compressor. Gas return line 815 connects port 706 of FIG. 6 with the main laser gas stream entering the downstream heat exchanger 816. The downstream heat exchanger thereby serves the dual purpose of rejecting heat added by the electrical discharge of the laser resonator and rejecting the heat from the motor bearings and rotor of the gas compressor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A centrifugal turbine blower for use in high-powered laser applications, said blower comprising:
   an induction motor;
   a gas mixing unit configured to receive a plurality of gases; and
   a control module for operating said gas mixing unit;
   wherein said gas mixing unit combines said plurality of gases that are delivered at a specific flow rate to a laser; and
   wherein said induction motor has a common housing comprising variable rotor, shroud and compressor sizes.

2. The blower of claim 1, further comprising:
   a foil radial bearing; and
   a foil thrust bearing;
   wherein the bearings are of the non-contact, self lubricating type.

3. The blower of claim 2, wherein said foil radial bearing contains bump foil.

4. A centrifugal turbine blower for use in high-powered laser applications, said blower comprising:
   an induction motor;
   a foil radial bearing;
   a foil thrust bearing;
   a bypass load;
   a gas mixing unit configured to receive a plurality of gases;
   a microprocessor control module; and
   an impeller having a backplate with holes;
   wherein said motor has a common housing comprising of variable rotor, shroud and compressor sizes;
   wherein said gas mixing unit is configured to blend said plurality of gases into a predetermined mixture delivered at a specific flow rate to a laser;
   wherein said microprocessor control module operates said gas mixing unit; and
   wherein said bypass load allows for peak efficiency of the device while avoiding surge conditions.

5. The blower of claim 4, wherein said bearings are of the non-contact, self lubricating type.

6. The blower of claim 4, wherein said foil radial bearing contains bump foil.

7. The blower of claim 4, wherein said plurality of gases is a gas selected from the group consisting of Helium, Nitrogen and Carbon-dioxide.

8. A centrifugal turbine blower for use in high-powered laser applications, said blower comprising:
   an induction motor;
   a gas mixing unit configured to receive a predetermined mixture of Helium, Nitrogen and Carbon-dioxide gases from a plurality of bottled gas sources; and
   a microprocessor control module, wherein said microprocessor control module operates said gas mixing unit;
   wherein said gas mixing unit is configured to receive said predetermined mixture of Helium, Nitrogen and Carbon-dioxide gases, and wherein said predetermined mixture is delivered at a specific flow rate to a laser; and
   wherein said induction motor has a common housing comprising variable rotor, shroud and compressor sizes.

9. The blower of claim 8, further comprising a foil radial bearing of the non-contact, self-lubricating type.

10. The blower of claim 9, further comprising a foil thrust bearing of the non-contact self-lubricating type.

11. The blower of claim 10, wherein said foil radial bearing contains bump foil.

* * * * *